United States Patent [19]

Miller

[11] Patent Number: 5,094,264

[45] Date of Patent: Mar. 10, 1992

[54] ELECTROMECHANICAL SOLENOID VALVE WITH RATCHET SYSTEM FOR POSITIONING THE COIL ASSEMBLY

[75] Inventor: Terry L. Miller, Sterling, Mich.

[73] Assignee: Borg-Warner Automotive Electronic & Mechanical Systems Corporation, Sterling Heights, Mich.

[21] Appl. No.: 613,273

[22] Filed: Nov. 13, 1990

[51] Int. Cl.⁵ .................. F16K 27/02; F16K 31/06
[52] U.S. Cl. .................................. 137/270; 251/129.15
[58] Field of Search ............... 251/129.15; 137/270; 138/45

[56] References Cited

U.S. PATENT DOCUMENTS

| 3,252,471 | 5/1966 | Olson | 137/270 X |
| 3,363,878 | 1/1968 | Smith et al. | 137/270 X |
| 4,889,316 | 12/1989 | Donahue | 251/129.15 |

*Primary Examiner*—Arnold Rosenthal
*Attorney, Agent, or Firm*—Hugh A. Abrams; Greg Dziegielewski

[57] ABSTRACT

An electromechanical valve assembly is provided for regulation of hydraulic or pneumatic flow. The coil assembly of the solenoid portion of the valve is spring biased against the valve assembly. The coil assembly can be rotated through a full 360 degrees about the valve assembly to allow connection to an electrical wiring harness.

14 Claims, 3 Drawing Sheets

ELECTROMECHANICAL SOLENOID VALVE WITH RATCHET SYSTEM FOR POSITIONING THE COIL ASSEMBLY

BACKGROUND OF THE INVENTION

1. Field of the Invention

This invention relates generally to solenoid valves directed to the regulation of hydraulic or pneumatic flow. More particularly, the present invention relates to the adjustable positioning of the coil assembly of a solenoid valve for control of hydraulic fluid flow in a power steering pump system.

2. Description of Related Art

Electromechanical valves are commonly used in a wide variety of automotive applications, such as power steering systems and the like. An electronically actuated solenoid valve typically controls a metering device for the control of pneumatic or hydraulic flow. The valve generally includes two portions. One portion is the electronic solenoid portion, which includes an electrical winding or coil and an armature. The second portion is the hydraulic flow control portion which has a metering device for regulation of fluid flow in response to movement of the armature and energization of the electrical coil of the electronic solenoid portion of the valve. Typically, such valves attempt to regulate flow in an on-off fashion or in a restricted-unrestricted fashion.

In such a valve, the armature is typically spring biased and actuated to control a fluid flow, either by movement of the armature itself or the control of a metering system operatively connected to the armature. At appropriate times, current is supplied to the electrical winding, or coil, and movement of the iron armature is caused by the magnetic flux in a magnetic flux path.

The armature can be placed inside the coil, or along the base of the coil, to complete a magnetic flux path. The electrical winding provides the magnetic flux which acts in conjunction with the spring force and against the fluid flow force. Energization of the winding causes movement of the armature between two positions and results in two states of resultant fluid flow, such as on-off or restricted-unrestricted. Similarly, modulation of the energization of the winding can result in varying degrees of control over the states of flow.

In such applications, the electrical winding and armature portions of the valve must be operatively connected to the hydraulic flow control portions of the device. Typically, the electronic portions of the valve are placed at a first end of the valve assembly, and the hydraulic flow control portions are placed at a second end or base of the valve. The electrical winding must also be connected to the electronic input, such as a signal from the electronic control module of the automobile. Similarly, the hydraulic flow control portions must also be connected to the hydraulic system of the controlled system, such as the power steering pump fluid flow path. The entire valve must therefore be appropriately positioned in order to allow all of these connections, that is, connections to the electronics, connections to the hydraulics, and connections between the electronics and the hydraulics.

The hydraulic flow control portions of the electromechanical solenoid valve are typically connected directly into the flow path of the hydraulic fluid by a threaded fitting. By inserting the valve directly into the flow path, optimum flow control can be obtained with a minimum of additional alteration of the flow path of the system.

However, when the hydraulic flow control portion of the valve is threaded into the fluid flow path, the remainder of the valve is thereby placed into a fixed position. Such fixed positioning can create difficulties in the attachment of the electrical winding to the electronic controls of the automobile. The electrical winding is typically attached to the electronic control by an electrical wiring harness. The wiring harness is attached to a terminal connected to the coil in the electromechanical valve. When the position of the entire electromechanical valve is fixed by the threading of the hydraulic control portions of the valve, difficulties can be encountered in connecting the wiring harness to the valve electrical terminal. For example, the wiring harnesses of different automobiles are placed in different locations and attention may not be given in the design to the need for location on a particular side or position with regard to the position of the electromechanical valve and its location within the fluid flow system.

The present invention overcomes the drawbacks of these prior art valves through the provision of a ratcheting assembly. The ratcheting assembly allows a full 360 degrees of rotation of the electrical winding assembly after the hydraulic flow control portions of the valve have been threadedly connected and fixed with regard to the fluid flow path.

SUMMARY OF THE INVENTION

In one embodiment of the present invention, an electromechanical valve assembly is provided having an electrical winding or coil of an axial length. An iron armature is disposed within at least a portion of the axial length in the center of the winding. The armature is fixedly attached to a metering rod member, such that movement of the armature results in a corresponding movement of the metering rod.

The armature and metering rod are placed within a body piece, or pole piece, which forms the main structure of the valve assembly. Movement of the armature results in movement of the metering rod and controls the flow of hydraulic fluid through the valve assembly. The armature slides within a sleeve, which is placed within the center of the electrical winding. The sleeve is held within the coil by a stop washer riveted against the sleeve.

A curved spring, or Belleville washer, is interposed between the stop washer and the coil assembly. The spring washer biases the coil assembly toward the body of the valve. At the opposite end of the coil assembly, a ratchet disc is interposed between the coil assembly and the body of the valve. The coil assembly cover includes recesses and the ratchet disc has corresponding extending members. Thus, rotation of the coil assembly allows placement of the extending members into different recesses. In this manner, the coil assembly can be moved against the bias of the spring washer and rotated into various positions. The coil assembly can therefore be rotated into any position about the body of the valve assembly.

BRIEF DESCRIPTION OF THE DRAWINGS

For a more complete understanding of this invention, reference should be made to the embodiment illustrated in greater detail in the accompanying drawings and described by way of an example of the invention. In the drawings.

While the invention will be described in connection with a preferred embodiment, it will be understood that it is not intended to limit the invention to that embodiment, but it is intended to cover all alternatives, modifications and equivalents as may be included within the spirit and scope of the invention as defined by the appended claims.

DETAILED DESCRIPTION OF THE DRAWINGS

Figure 1:
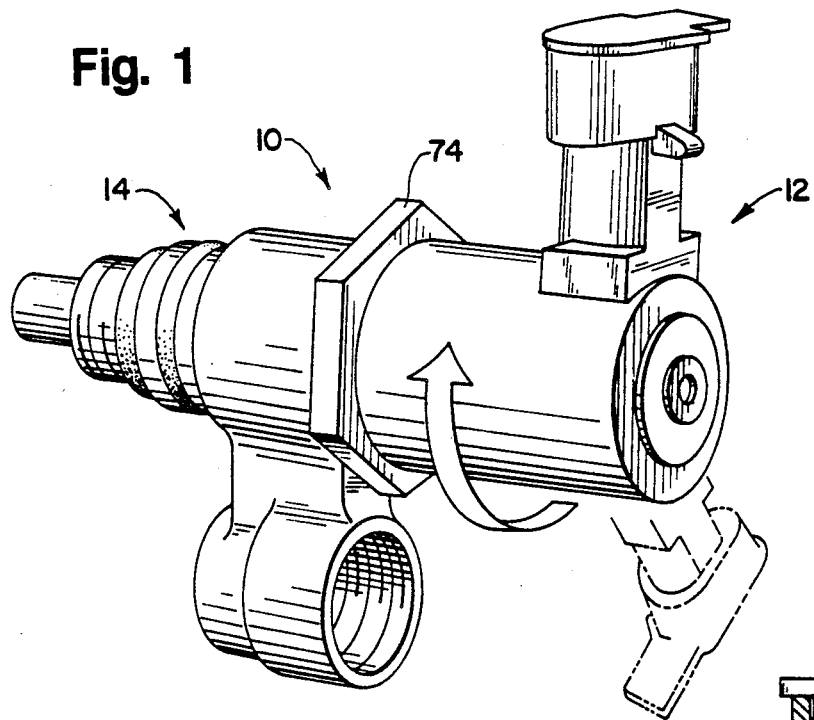
FIG. 1 is a perspective view of the valve assembly, showing one direction of rotation of the coil assembly about the body of the valve assembly.
Figure 2:
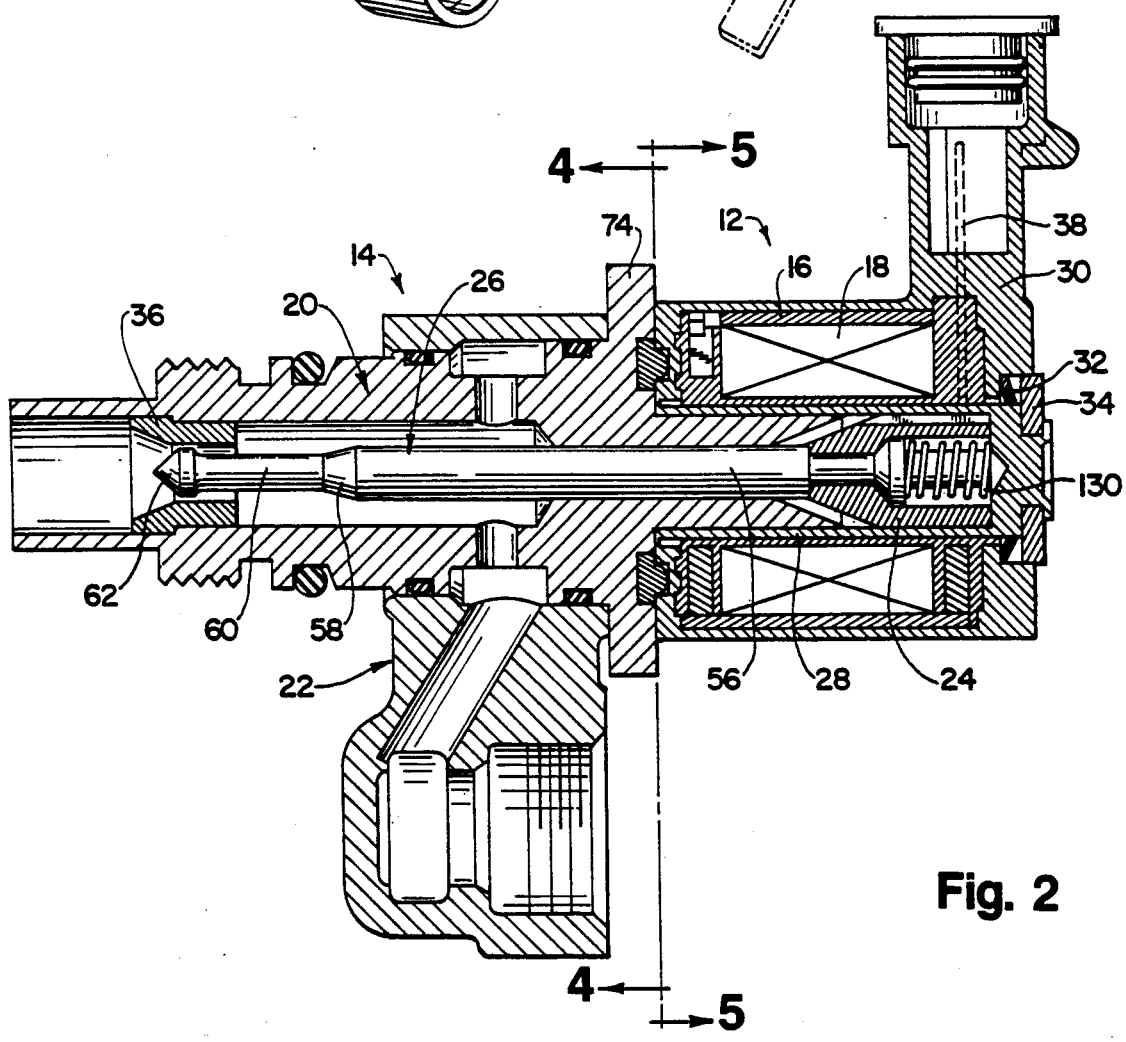
FIG. 2 is a sectional view of valve assembly, showing the coil assembly portion and the hydraulic flow control portion.

Turning now to the drawings, an electromechanical valve assembly is shown in FIG. 1, generally at 10, having an electric coil assembly portion 12 and a hydraulic flow control portion 14. The portions 12, 14, are shown in greater detail in FIGS. 2 and 3. The coil assembly portion includes a bobbin 16 having an electrical winding 18, or coil. The hydraulic control portion 14 includes a valve assembly body 20 and a hydraulic fitting 22 disposed about the body 20.

Within the bobbin 16 and assembly body 20 are a series of components of the valve. These components include an armature 24 which is fixedly connected to a metering rod member 26. Between the armature 24 and the bobbin 16 is a sleeve member 28. On the outside of the bobbin 16 is a cover assembly 30 which encloses the bobbin and winding. At one end of the assembly is a curved washer spring 32 and stop washer 34. At the opposite end, within the valve body 20 is an orifice member 36.

The coil assembly includes a standard winding for creating magnetic flux with the application of an electric current to the winding at the terminal 38. Access to the terminal 38 is through the connector portion 40. When a wiring harness is not attached to the connector portion 40, a plug 42 is utilized to keep dirt and other materials from entering the terminal area. The plug is constructed of a rubber compound.

The armature 24 is preferably of iron or other ferromagnetic material. The armature includes a large diameter, interior portion 44, an angled interior portion 46 and a small diameter interior portion 48. The armature 24 includes a notch 50, or slot, along the outside of the armature body. The outside of the armature also includes a bevelled portion 52 as well as a cylindrical portion 54. The bevel is preferably about 20 degrees from the vertical.

The armature 24 is attached to the metering rod member 26 by a through-molding process. The metering rod member 26 includes a central cylindrical portion 56, a bevelled portion 58, an end cylindrical portion 60 and a tip 62. The tip 62 is conical to allow passage of fluid around the tip and through the orifice 36.

The body 20 of the valve includes a series of stepped interior portions. The central cylindrical section 64 is connected through a central bevelled portion 66 into an end portion 68 and an end bevelled portion 70. At the end opposite the end portion 68 is a cylindrical portion 72, which holds the orifice 36.

The outside of the body of the valve includes a number of stepped portions. One end includes a hexagonal portion 74 which is utilized for driving the valve assembly into a fluid passage by threaded connection 76. The body also includes recesses 78, 80, 82 for O-rings 84, 86, 88. The body also includes a fluid passageway 90 for passage of fluid into the hydraulic fitting 22. Additional O-rings (not shown) can be used to fix the fitting to the valve body.

The fitting 22 includes passageway 92 and fitting access port 94, with internal threads 96. The fitting 22 slides around the body 20, and provides an outlet for fluid from the valve body 20.

Figure 3:
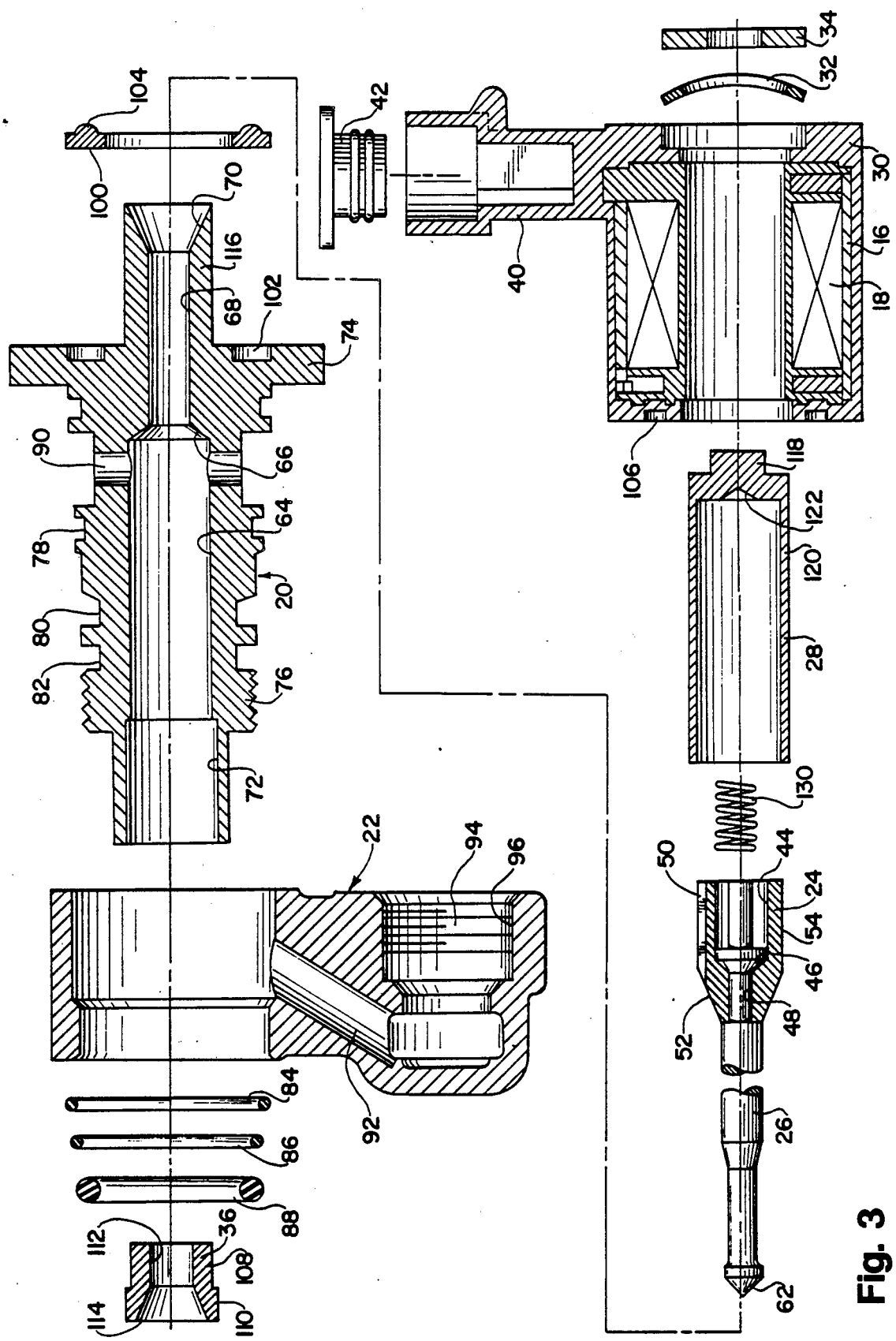
FIG. 3 is an exploded view of the valve assembly, showing the valve body and relationship of components.
Figure 5:
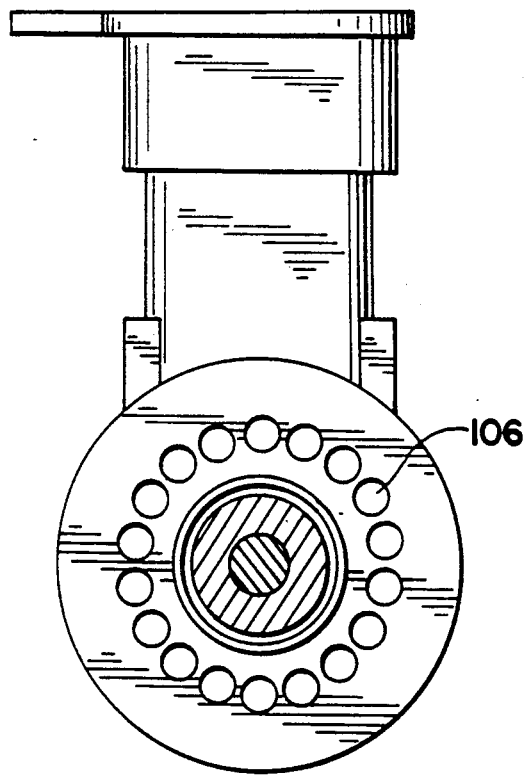
FIG. 5 is a sectional view along the line 5—5 of FIG. 2.
Figure 4:
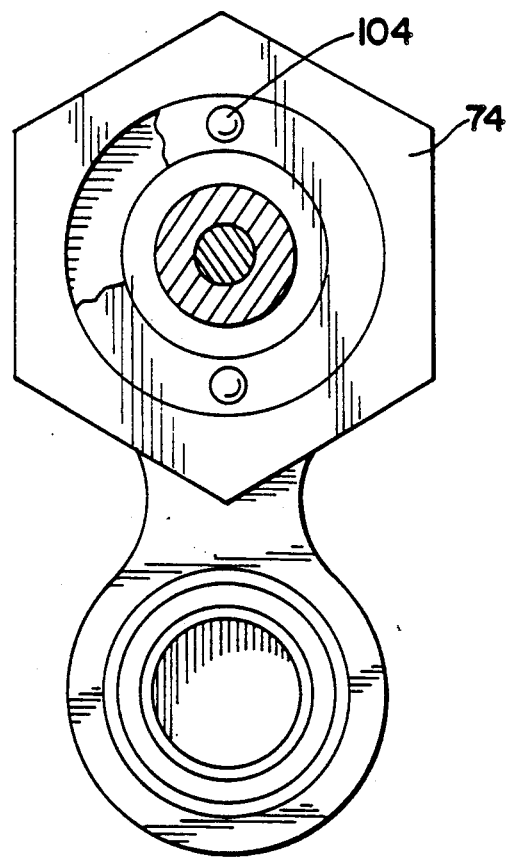
FIG. 4 is a sectional view along the line 4—4 of FIG. 2.
Figure 6:
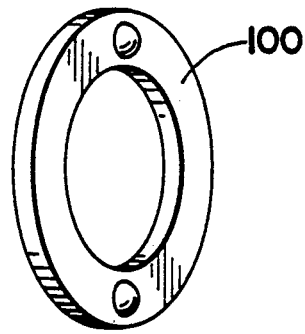
FIG. 6 is a perspective view of the ratchet disc of the valve assembly.

At the end of the valve body opposite the fitting 22, a ratchet disc 100 is placed within a recess 102 of the hexagonal portion 74 of the valve body 20. The ratchet disc 100 is staked to the valve body in several locations to prevent movement of the ratchet disc 100. The ratchet disc 100 includes extending portions 104, preferably one on each side. The extending portions 104 are fitted into recesses 106, or retaining sockets, in the cover assembly 30. A number of retaining sockets 106 are provided about the circumference of the cover assembly 30. The retaining sockets 106 are shown in FIG. 3 and in FIG. 5.

The orifice 36 is located at the fluid inlet side of the valve. The orifice has a stepped outside portion, including cylindrical portions 108, 110. The inside portion has a cylindrical portion 112 and a bevelled, or angled portion 114. The orifice 36 is press fit into the cylindrical portion 72 of the valve body.

The valve body is also press fit into the sleeve 28 at the upper portion 116. The outer portion of the sleeve is of stepped construction, including the upper cylindrical portion 118 and the lower cylindrical portion 120. The upper and lower designations are only for identification, and do not necessarily imply a vertical location in the final assembly. The inside of the sleeve includes a relieved portion 122.

In assembly, the sleeve 28 is placed over the upper portion 16 of the valve body 20 by a press fit. The sleeve is crimped to secure it in place. The ratchet disc 100 is then placed in the recess 102 of the valve body.

A spring 130 is placed within the armature. The armature 24 and connected metering rod member 26 are placed within the valve body, with the spring 130 within the recess of the sleeve. The bobbin casing 18, with the entire coil assembly 12, is then placed over the sleeve. The spring washer 32 and stop washer 34 are placed on top of the sleeve and secured by riveting, or other suitable methods.

The orifice 36 is press fit into the bottom cylindrical portion 72 of the valve body. The tip 62 of the metering rod member 26 will extend into the orifice. The hydraulic fitting 22 is press fit over the valve body.

The valve body is threaded into the fluid passage of the hydraulic system (not shown) by threads 76 and movement of hexagonal portion 74. Fluid enters the valve body through the orifice 36 and travels past the tip 62 of the metering rod member 26. Fluid travels through passage 64, around the metering rod 26 and exits the valve body through passage 90. Fluid then travels through passage 92 and exits through fitting portion 96.

Energization of the electrical winding by providing a current to the terminal, causes the generation of a magnetic flux in the coil. The flux causes movement of the iron armature against the bevelled portion 70 of the valve body. Movement of the armature causes a movement of the metering rod member within the orifice 36. Any change in movement of the metering rod results in a change in the flow conditions of flow of fluid through the valve body. The current to the winding can be from a power supply of a direct current source, a square wave generator, a variable resistor, a pulse width modulation circuit, or an automobile on-board computer functioning as a signal source.

In operation, the spring washer 32 and stop washer 34 allow limited movement of the cover assembly 30 in the longitudinal direction of the valve body. Such limited movement allows the cover assembly 30 to move and the extending members 104 of the ratchet disc 100 can be placed into different recesses 106 of the cover assembly. In this manner, the cover assembly 30 can be rotated 360 degrees and held in various positions by the use of different recesses 106 with the extending members. While FIG. 1 shows rotation in a clockwise direction, the coil assembly can also be rotated in the counterclockwise direction. Thus, the cover assembly can be rotated to allow placement of the terminal 38 in a position where it can be reached by the wiring harness of the automotive electronic system, which extends from the electronic control module of the automobile.

From the foregoing it will be seen that the present invention allows rotational movement of the coil assembly, and the terminal for attachment to the wiring harness, after securing the valve body assembly within the threaded connection of the fluid system. The present invention allows the ratcheting movement of the entire coil assembly, while maintaining its position after a precise location is determined.

While one embodiment of the invention has been shown, it will be understood that the invention is not limited thereto since modifications may be made by those skilled in the art, particularly in light of the foregoing teachings.

What is claimed is:

1. An electromechanical valve assembly for control of fluid flow comprising:
    an electrical winding having an axial length;
    a magnetic flux circuit for said winding defining a flux path comprising a plurality of adjacent magnetic segments, including a generally cylindrical body segment extending within a portion of said axial length and an armature member disposed within a portion of said axial length;
    said armature being fixedly connected to a metering rod member, said metering rod member being located within at least a portion of said cylindrical body segment;
    a casing assembly enclosing said electrical winding, said casing assembly being operatively disposed adjacent to said cylindrical body segment, said casing assembly having a plurality of retention sockets located thereon;
    a ratchet disc member being operatively disposed between said casing assembly and said cylindrical segment; said ratchet disc member having a plurality of extended members operatively positioned for receiving said retention sockets; and,
    spring means positioned for operatively biasing said casing assembly in a direction toward said ratchet disc member; rotation of said casing assembly being effective to position said extension members within said retention sockets;
    energization of said winding causing movement of said armature for variation of the position of said metering rod member to alter fluid flow through the valve assembly.

2. The electromechanical valve assembly of claim 1 wherein said cylindrical body segment includes a fluid chamber means for passage of hydraulic fluid.

3. The electromechanical valve assembly of claim 2 wherein said fluid chamber means includes a fluid inlet and a fluid outlet, movement of said metering rod being effective to control the passage of fluid between said inlet and said outlet.

4. The electromechanical valve assembly of claim 2 wherein said ratchet disc member is disposed against said cylindrical segment.

5. The electromechanical valve assembly of claim 4 wherein said ratchet disc member is fixedly secured to said cylindrical segment.

6. The electromechanical valve assembly of claim 1 wherein said spring means further comprises a Belleville washer.

7. A ratchet mechanism for positioning two portions of a valve assembly, comprising
    a valve assembly body portion and a casing assembly portion, said casing assembly portion being operatively disposed adjacent to said valve assembly body portion,
    socket retention means operatively disposed between said casing assembly portion and said valve assembly portion,
    a ratchet disc means being operatively disposed between said casing assembly portion and said valve assembly portion, said ratchet disc means including extension means operatively positioned for receiving said socket retention means,
    resilient means positioned for operatively biasing said casing assembly portion in a direction toward said ratchet disc means, said resilient means permitting rotation of said casing assembly portion and being effective to operatively position said extension means within said retention means.

8. The ratchet mechanism of claim 7 wherein said casing assembly portion encloses at least a portion of an electronic solenoid portion.

9. The ratchet mechanism of claim 7 wherein said valve assembly body portion encloses at least a portion of a hydraulic flow control assembly.

10. The ratchet mechanism of claim 7 wherein said socket retention means include a plurality of substantially semi-spherically shaped members and said extension means include a plurality of substantially semi-spherically shaped members.

11. The ratchet mechanism of claim 7 wherein said resilient means includes a curved spring washer member positioned against said casing assembly portion.

12. The ratchet mechanism of claim 7 wherein said socket retention means are located within said casing assembly portion.

13. The ratchet mechanism of claim 7 wherein said ratchet disc means is disposed against said valve assembly body portion.

14. The ratchet mechanism of claim 13 wherein said ratchet disc means is secured within said valve assembly body portion.

* * * * *

UNITED STATES PATENT AND TRADEMARK OFFICE
CERTIFICATE OF CORRECTION

PATENT NO. : 5,094,264
DATED : March 10, 1992
INVENTOR(S) : Terry L. Miller

It is certified that error appears in the above-identified patent and that said Letters Patent is hereby corrected as shown below:

On the title page, item [76]: after the heading "Inventor" please delete "Mich." and substitute therefor --Ill.--.

In column 3, lines 10 and 11, after "components" please delete ":" and substitute therefor --;--.

In column 3, line 15, after "2" please delete ":" and substitute therefor --;--; after "and" please delete ",".

In column 5, line 6, after "terminal" please delete ",".

IN THE CLAIMS

Col. 5, In claim 1, line 65, after "cylindrical" please insert --body--; line 68, after "and" delete ",".

Col. 6, In claim 4, line 19, after "cylindrical" please insert --body--.

Col. 6, In claim 5, line 22, after "cylindrical" please insert --body--.

UNITED STATES PATENT AND TRADEMARK OFFICE
CERTIFICATE OF CORRECTION

PATENT NO. : 5,094,264

DATED : March 10, 1992

INVENTOR(S) : Terry L. Miller

It is certified that error appears in the above-identified patent and that said Letters Patent is hereby corrected as shown below:

COLUMN 6:

In claim 7, line 27, after "comprising" please insert --:--; line 31, after "portion" delete "," and substitute therefor --;--; line 34, after "portion" delete "," and substitute therefor --;--; line 39, after "means" delete "," and substitute therefor --;--.

Signed and Sealed this

Seventh Day of September, 1993

Attest:

BRUCE LEHMAN

*Attesting Officer*       *Commissioner of Patents and Trademarks*